United States Patent
Xu

(10) Patent No.: US 11,344,806 B2
(45) Date of Patent: May 31, 2022

(54) METHOD FOR RENDERING GAME, AND METHOD, APPARATUS AND DEVICE FOR GENERATING GAME RESOURCE FILE

(71) Applicant: Tencent Technology (Shenzhen) Company Limited, Shenzhen (CN)

(72) Inventor: Minjun Xu, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 237 days.

(21) Appl. No.: 16/745,079

(22) Filed: Jan. 16, 2020

(65) Prior Publication Data

US 2020/0147491 A1 May 14, 2020

Related U.S. Application Data

(63) Continuation of application No. PCT/CN2018/096002, filed on Jul. 17, 2018.

(30) Foreign Application Priority Data

Jul. 21, 2017 (CN) .......................... 201710600237.7

(51) Int. Cl.
*G06T 17/20* (2006.01)
*A63F 13/52* (2014.01)
(Continued)

(52) U.S. Cl.
CPC .............. *A63F 13/52* (2014.09); *G06T 11/40* (2013.01); *G06T 15/005* (2013.01); *G06T 15/04* (2013.01); *G06T 17/20* (2013.01); *A63F 2300/66* (2013.01)

(58) Field of Classification Search
None
See application file for complete search history.

(56) References Cited

U.S. PATENT DOCUMENTS

| 6,587,104 B1 | 7/2003 | Hoppe | |
|---|---|---|---|
| 9,626,789 B2 * | 4/2017 | Hillesland | G06T 15/04 |

(Continued)

FOREIGN PATENT DOCUMENTS

| CN | 101364310 A | 2/2009 |
|---|---|---|
| CN | 101840566 A | 9/2010 |

(Continued)

OTHER PUBLICATIONS

Tencent Technology, ISRWO, PCT/CN2018/096002, Sep. 26, 2018, 8 pgs.

(Continued)

*Primary Examiner* — Sultana M Zalalee
(74) *Attorney, Agent, or Firm* — Morgan, Lewis & Bockius LLP

(57) ABSTRACT

Embodiments of this application disclose a game rendering method performed at a computing device. In a resource packing process, fragmentation processing is performed on a texture map to obtain a plurality of fragmented textures. The fragmented textures corresponding to a used target texture map are loaded based on a requirement of game rendering, and the internal memory loading overheads can be effectively reduced, and the internal memory burden can be reduced. Moreover, the fragmented textures corresponding to the target texture map are merged for rendering, and the picture effect of rendering can be ensured, and the internal memory burden can be prevented from linearly increasing with running of a game, thereby ensuring that the game runs smoothly.

17 Claims, 4 Drawing Sheets

---

S201 — Obtain at least one texture map required by game rendering, the texture map including original texture data S202 — Perform fragmentation processing separately on each texture map to obtain a plurality of fragmented textures S203 — Encapsulate the fragmented textures corresponding to each texture map into a resource file

(51) Int. Cl.
    *G06T 11/40*     (2006.01)
    *G06T 15/04*     (2011.01)
    *G06T 15/00*     (2011.01)

(56) References Cited

U.S. PATENT DOCUMENTS

| | | | |
|---|---|---|---|
| 2002/0007402 A1* | 1/2002 | Thomas Huston | G06F 16/9574 709/217 |
| 2005/0172080 A1* | 8/2005 | Miyauchi | G06F 12/121 711/136 |
| 2006/0152522 A1* | 7/2006 | Strassenburg-Kleciak | G06T 17/05 345/581 |
| 2007/0180466 A1* | 8/2007 | Ando | H04N 9/79 725/37 |
| 2014/0267346 A1 | 9/2014 | Ren et al. | |
| 2015/0235392 A1* | 8/2015 | Sakurai | G06T 17/20 345/582 |
| 2015/0310642 A1* | 10/2015 | Kruglick | G06F 15/16 345/441 |
| 2016/0048980 A1 | 2/2016 | Wang et al. | |
| 2016/0071282 A1* | 3/2016 | Anzai | G06T 11/60 382/173 |
| 2016/0078658 A1* | 3/2016 | Santos | G06T 3/40 345/619 |
| 2018/0033185 A1* | 2/2018 | Sakurai | G06T 15/04 |
| 2019/0347854 A1* | 11/2019 | Karlov | G06T 15/04 |

FOREIGN PATENT DOCUMENTS

| | | |
|---|---|---|
| CN | 105931180 A | 9/2016 |
| CN | 105957133 A | 9/2016 |
| CN | 107463398 A | 12/2017 |
| JP | 2009176167 A | 8/2009 |
| KR | 100485241 B1 | 4/2005 |
| KR | 20070055420 A | 5/2007 |
| KR | 20160120128 A | 10/2016 |

OTHER PUBLICATIONS

Tencent Technology, IPRP, PCT/CN2018/096002, Jan. 21, 2020, 6 pgs.

Extended European Search Report, EP18834397.4, dated Mar. 25, 2021, 8 pgs.

* cited by examiner

METHOD FOR RENDERING GAME, AND METHOD, APPARATUS AND DEVICE FOR GENERATING GAME RESOURCE FILE

CROSS-REFERENCE TO RELATED APPLICATIONS

This application is a continuation application of PCT/CN2018/096002, entitled "GAME RENDERING METHOD AND APPARATUS, GAME RESOURCE FILE GENERATION METHOD AND APPARATUS, AND DEVICE" filed on Jul. 17, 2018, which claims priority to Chinese Patent Application No. 201710600237.7, entitled "GAME RENDERING METHOD AND APPARATUS, STORAGE DEVICE, AND TERMINAL" filed with China National Intellectual Property Administration on Jul. 21, 2017, all of which are incorporated by reference in their entirety.

FIELD OF THE TECHNOLOGY

This application relates to the field of Internet technologies, specifically, to the field of Internet game technologies, and in particular, to a game rendering method, a game resource file generation method, a game rendering apparatus, a game resource file generation apparatus, a storage device, and a terminal.

BACKGROUND OF THE DISCLOSURE

For a conventional game rendering method, all texture maps (for example, scenery, characters, and user interfaces (UI)) that may be required in a current running scene of a game are generally pre-loaded into an internal memory. In a case that a texture map needs to be rendered, the texture map is directly obtained from the internal memory. However, many texture maps are actually not in use always. If the texture maps are loaded into the internal memory, loading overheads are increased, and internal memory footprint is increased, resulting in stalling of the game. Another game rendering method further exists in the related art, and is capable of reducing the internal memory burden to some extent. In the method, a texture packer is used to combine a plurality of small texture maps into one large texture map in a resource packing process. The large texture map is loaded into the internal memory only in a case that a plurality of game elements (for example, scenery, characters) needs to be rendered, thereby saving particular loading overheads. In response to rendering the plurality of game elements, the elements can be combined into one rendering batch provided that the elements use the same large texture map and rendering parameters are the same, thereby improving the rendering performance. Although the method in which the texture packer is used improves the rendering performance, the entire large texture map needs to be loaded into the internal memory simultaneously. Due to a large quantity of texture reuse during running of the game, the method also results in a large quantity of unnecessary internal memory overheads. Moreover, the internal memory burden is significantly increased with version update and content increase of the game, resulting in stalling of the game.

SUMMARY

Embodiments of this application provide a game rendering method and apparatus, a game resource file generation method and apparatus, a storage device, and a terminal. The picture effect of rendering can be ensured, and the internal memory burden can be prevented from linearly increasing with running of a game, thereby ensuring that the game runs smoothly.

According to an aspect, an embodiment of this application provides a game rendering method performed at a computing device having one or more processors and memory storing a plurality of programs to be executed by the one or more processors and the method:

obtaining a resource file of a game, the resource file including at least one texture map required by the game rendering, the one texture map being formed by merging a plurality of fragmented textures;

determining a target texture map required by a to-be-rendered mesh in a current running scene of the game;

searching the resource file for fragmented textures corresponding to the target texture map; and merging the fragmented textures corresponding to the target texture map for the game rendering.

Preferably, before the obtaining a resource file of a game, the method further includes:

obtaining at least one texture map required by the game rendering, the texture map including original texture data;

performing fragmentation processing separately on each texture map to obtain a plurality of fragmented textures, a fragmented texture including a piece of fragmented texture data and marginal original texture data of a preset width surrounding the fragmented texture data;

encapsulating the fragmented textures corresponding to each texture map into the resource file.

Preferably, the performing fragmentation processing separately on each texture map to obtain a plurality of fragmented textures includes:

selecting each texture map in sequence, and cutting the selected texture map into rows according to a first preset specification to obtain a plurality of rectangular frames;

performing fragmentation processing on the original texture data included in the selected texture map according to a second preset specification to obtain a plurality of pieces of fragmented texture data, and obtaining the marginal original texture data of the preset width around each fragmented texture data;

filling corresponding rectangular frames with the plurality of pieces of fragmented texture data and the marginal original texture data of the preset width, a filled rectangular frame forming a fragmented texture;

a value of the first preset specification being greater than or equal to a sum of a value of the second preset specification and a value of twice the preset width.

Preferably, the filling corresponding rectangular frames with the plurality of pieces of fragmented texture data and the marginal original texture data of the preset width, a filled rectangular frame forming a fragmented texture includes:

reserving a margin of the preset width on each of an upper side and a lower side of each rectangular frame, and adding the margin of the preset width on each of a left side and right side of each rectangular frame, so that each rectangular frame has a central region and a marginal region surrounding the central region; and filling the central regions of corresponding rectangular frames with the plurality of pieces of fragmented texture data, and respectively filling the marginal regions of the corresponding rectangular frames with the marginal original texture data of the preset width surrounding the plurality of pieces of fragmented texture data, a filled rectangular frame forming a fragmented texture.

Preferably, the encapsulating the fragmented textures corresponding to each texture map into the resource file includes:

obtaining an attribute of each texture map, the attribute including an identity (ID), a release type, and offset information, the release type including immediate release, automatic release, or a resident internal memory;

generating a brief information table based on the attribute of each texture map; and storing the brief information table into a file header of the resource file, and storing the fragmented textures corresponding to each texture map into a file body of the resource file.

Preferably, the merging the fragmented textures corresponding to the target texture map for rendering includes:

cutting a preset dynamic loading region in an internal memory into rows according to the first preset specification, to form a plurality of dynamic loading rows;

allocating an idle region of the dynamic loading rows by using a bin-packing algorithm;

loading the fragmented textures corresponding to the target texture map in sequence into the idle region of the dynamic loading row; and reading the loaded fragmented textures from the dynamic loading rows and submitting the fragmented textures to a rendering engine of the game for rendering.

Preferably, after the merging the fragmented textures corresponding to the target texture map for rendering, the method further includes:

obtaining the release type of the target texture map from the file header of the resource file;

releasing the dynamic loading rows occupied by each fragmented texture of the target texture map according to the obtained release type; and merging the recycled dynamic loading rows.

According to another aspect, an embodiment of this application provides a computing device comprising one or more processors, memory coupled to the one or more processors and a plurality of programs stored in the memory that, when executed by the one or more processors, cause the client to perform the aforementioned game rendering method.

According to another aspect, an embodiment of this application provides a non-transitory computer readable storage medium storing a plurality of machine readable instructions in connection with a client having one or more processors, wherein the plurality of machine readable instructions, when executed by the one or more processors, cause the client to perform the aforementioned game rendering method.

According to the embodiments of this application, fragmentation processing is performed on a texture map to obtain a plurality of fragmented textures in a resource packing process. The fragmented textures corresponding to a used target texture map are loaded based on a requirement of game rendering, and the internal memory loading overheads can be effectively reduced, and the internal memory burden can be reduced. Moreover, the fragmented textures corresponding to the target texture map are merged for rendering, and the picture effect of rendering can be ensured, and the internal memory burden can be prevented from linearly increasing with running of a game, thereby ensuring that the game runs smoothly.

BRIEF DESCRIPTION OF THE DRAWINGS

To describe the technical solutions in the embodiments of this application or in the related art more clearly, the following briefly introduces the accompanying drawings for describing the embodiments or the related art. Apparently, the accompanying drawings in the following description show merely some embodiments of this application, and a person of ordinary skill in the art may still derive other drawings from the accompanying drawings without creative efforts.

DESCRIPTION OF EMBODIMENTS

Figure 1:
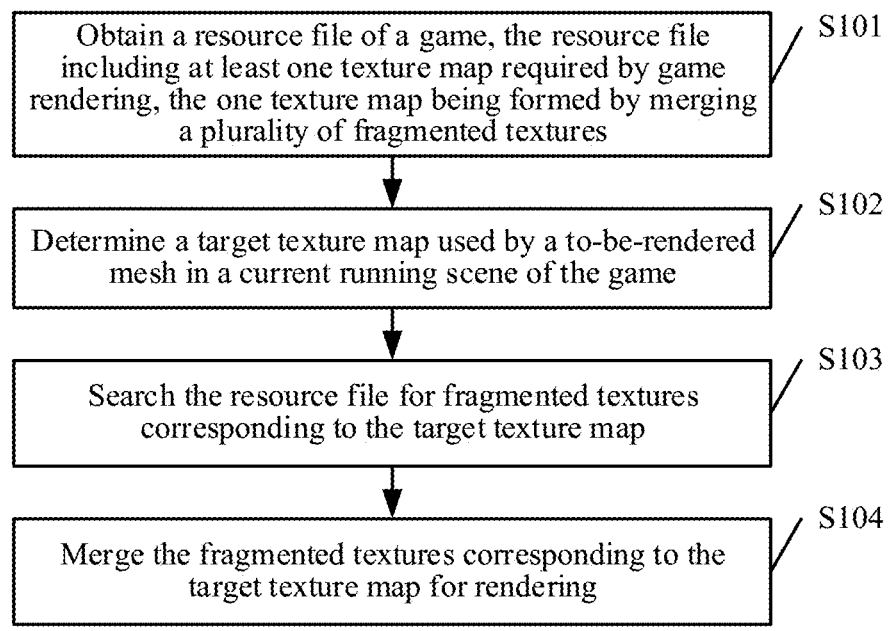
FIG. 1 is a flowchart of a game rendering method according to an embodiment of this application.

The following clearly and completely describes the technical solutions in the embodiments of this application with reference to the accompanying drawings in the embodiments of this application.

Game rendering is a series of processing processes in which a computer draws scenes of a game, including processes such as spatial illumination calculation, rasterization and clipping, texture sampling, depth detection, and alpha blending. The game rendering needs to use a variety of resources, including animation, and texture maps. The texture map is a map file used in a running scene of a game. The texture map enables the scene of the game to be more real. The texture map has a variety of different formats and is used in a variety of application scenarios, for example, a 3-dimension (3D) texture map affixed to a 3D model or used for 3D spatial UI interaction, and a 2D texture map affixed to a 2D plane or used for a 2D UI interaction. The texture sampling generally includes nearest point sampling and linear sampling. The nearest point sampling is to sample original texture data included in a texture map according to pixel coordinates of the texture map, find the nearest original texture data, and use a pixel of the nearest original texture data as a color value of the texture map. The linear sampling is to continue to sample, after the nearest original texture data is found, a plurality of pieces of data around the original texture data and calculate a pixel mean of the sampled pieces of data to determine the pixel mean as the color value of the texture map.

Generally, resources such as the texture map used in the game rendering are produced by an art designer in a process of game development. The produced original resources cannot be directly used in an application program of the game, but require some processing, including binarization, encryption, and compression. The processes are called resource packing, and the obtained file is a resource file of the game. The resource file includes resources such as animation and texture maps required by the game rendering, and the resources in the resource file can be directly applied to the game.

For a conventional game rendering method, all texture maps (for example, scenery, characters, and UIs) that may be required in a current running scene of a game are generally pre-loaded into an internal memory. In a case that a texture map needs to be rendered, the texture map is directly obtained from the internal memory. However, many texture maps are actually not in use always. For example, a weapon in the scene may not appear at the beginning, and therefore does not need to be rendered at the beginning. If the texture maps are loaded into the internal memory, loading overheads are increased, and internal memory footprint is increased, resulting in stalling of the game. Another game rendering method further exists in the related art, and is capable of reducing the internal memory burden to some extent. In the method, a texture merging tool (for example, a texture packer) is used. The texture packer is used to combine a plurality of small texture maps into one large texture map in a resource packing process. The large texture map is loaded into the internal memory only in a case that a plurality of game elements (for example, scenery, characters) needs to be rendered, thereby saving particular loading overheads. In response to rendering the plurality of game elements, the elements can be combined into one rendering batch provided that the elements use the same large texture map and rendering parameters are the same, thereby improving the rendering performance. Although the method in which the texture packer is used improves the rendering performance, the entire large texture map needs to be loaded into the internal memory simultaneously. Due to a large quantity of texture reuse during running of the game, the method also results in a large quantity of unnecessary internal memory overheads. Moreover, the internal memory burden is significantly increased with version update and content increase of the game, resulting in stalling of the game.

According to the embodiments of this application, fragmentation processing is performed on a texture map to obtain a plurality of fragmented textures in a resource packing process. The fragmented textures corresponding to a used target texture map are loaded based on a requirement of game rendering, and the internal memory loading overheads can be effectively reduced, and the internal memory burden can be reduced. Moreover, the fragmented textures corresponding to the target texture map are merged for rendering, and the picture effect of rendering can be ensured, and the internal memory burden can be prevented from linearly increasing with running of a game, thereby ensuring that the game runs smoothly.

Based on the foregoing descriptions, an embodiment of this application provides a game rendering method. The game rendering method may be applied to a user-side terminal, for example, a mobile phone, a tablet computer, or a personal computer (PC).

Referring to FIG. 1, the game rendering method may include the following steps S101 to S104:

S101. Obtain a resource file of a game. The resource file includes at least one texture map required by game rendering, and the one texture map is formed by merging a plurality of fragmented textures.

The resource file of the game is a file formed after a resource packing process. The resource file includes but is not limited to one or more texture maps required by the game rendering, as well as some animation resources required by the game rendering. The texture map in the resource file is not a conventional entire texture map, but is formed by splicing and merging a plurality of fragmented textures. Generally, the resource file of the game is stored in a storage space of a terminal in which the game is located. For example, resource files of a computer game are stored in a storage space allocated for the game by the computer; or resource files of a mobile game are stored in a storage space allocated for the game by the mobile phone. In this case, the resource file of the game can be obtained from the storage space of the terminal in which the game is located.

S102. Determine a target texture map used by a to-be-rendered mesh in a current running scene of the game.

A mesh is generally used to present an element correlated with a region in the game. For example, a region of a game scene needs to present a map, so that the map element can be presented based on the mesh. Common meshes include a square mesh, a hexagonal mesh, and a triangular mesh. A game scene generally includes a plurality of meshes. In response to presentation of an element (for example, a character and scenery) in a mesh, the mesh needs to be rendered. In this case, the mesh is a to-be-rendered mesh. The mesh and the used texture map in the game scene are determined before the game rendering. For example, an element that needs to appear at a location in a scene is determined in the process of game development. The scene and the mesh are correlated with the texture map corresponding to the element, and are specifically correlated by using a sequence number of the scene, a range of a coordinate of a pixel in which the mesh is located, and an ID of the texture map. Therefore, in step S102, the used target texture map may be determined according to the current running scene of the game and the to-be-rendered mesh.

S103. Search the resource file for fragmented textures corresponding to the target texture map.

The target texture map in the resource file is not an entire texture map, but is formed by splicing and merging a plurality of fragmented textures. In a case that the target texture map needing to be rendered currently is determined, the plurality of fragmented textures corresponding to the target texture map may be found in the resource file.

104. Merge the fragmented textures corresponding to the target texture map for rendering.

An objective of merging the plurality of fragmented textures of the target texture map for rendering, rather than rendering the entire target texture map is to reduce a video memory and improve the rendering performance. Specifically, a process of the merging and rendering may include: first, the plurality of fragmented textures of the target texture map are loaded into the internal memory, and are submitted to a rendering engine of the game for rendering after the loading is completed. In an actual application, the picture effect of rendering obtained by merging the plurality of fragmented textures for rendering is kept completely the same as that obtained by rendering the entire target texture map. However, the burden of the internal memory and the video memory is obviously reduced, and the rendering performance is improved effectively.

According to this embodiment of this application, fragmentation processing is performed on a texture map to obtain a plurality of fragmented textures in a resource packing process. The fragmented textures corresponding to a used target texture map are loaded based on a requirement of game rendering, and the internal memory loading overheads can be effectively reduced, and the internal memory burden can be reduced. Moreover, the fragmented textures corresponding to the target texture map are merged for rendering, and the picture effect of rendering can be ensured, and the internal memory burden can be prevented from linearly increasing with running of a game, thereby ensuring that the game runs smoothly.

An embodiment of this application further provides a game resource file generation method. The game resource file generation method may be applied to a terminal used by a game developer or designer, for example, a PC.

Figure 2:
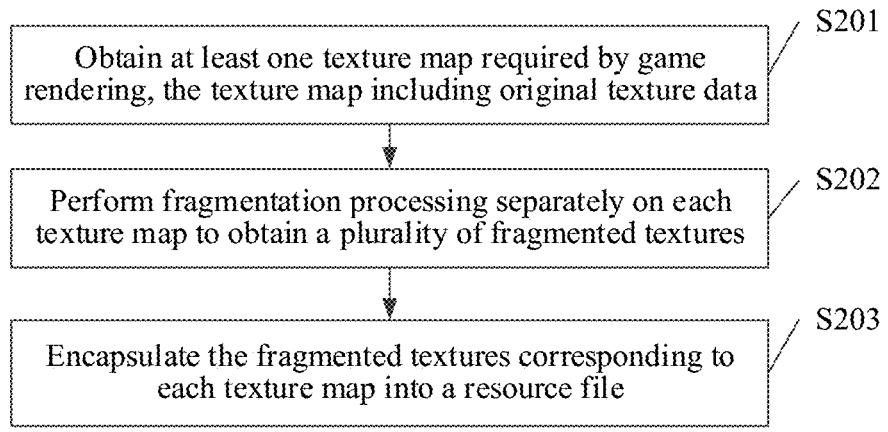
FIG. 2 is a flowchart of a game resource file generation method according to an embodiment of this application.

Referring to FIG. 2, the game resource file generation method may include the following steps S201 to S210:

S201. Obtain at least one texture map required by game rendering, the texture map including original texture data.

S202. Perform fragmentation processing separately on each texture map to obtain a plurality of fragmented textures.

S203. Encapsulate the fragmented textures corresponding to each texture map into the resource file of the game.

Steps S201 to S203 belong to the resource packing process. All texture maps required by the game rendering are produced by an art designer during game development. The texture maps exist in a form of the original texture data. In the resource packing process, the original texture data of the texture maps is fragmented. A texture map may be fragmented into a plurality of fragmented textures. The fragmented textures are encapsulated into the resource file and are to be used for the game rendering.

Optionally, a fragmented texture includes a piece of fragmented texture data and marginal original texture data of a preset width surrounding the fragmented texture data. The process of fragmentation processing in step S202 may specifically include the following steps s11 to s13:

s11. Select each texture map in sequence, and cut the selected texture map into rows according to a first preset specification to obtain a plurality of rectangular frames.

s12. Perform fragmentation processing on the original texture data included in the selected texture map according to a second preset specification to obtain a plurality of pieces of fragmented texture data, and obtain the marginal original texture data of the preset width around each fragmented texture data.

s13. Fill corresponding rectangular frames with the plurality of pieces of fragmented texture data and the marginal original texture data of the preset width. A filled rectangular frame forms a fragmented texture.

In actual implementation, step s13 may include the following processes: First, a margin of the preset width is reserved on each of an upper side and a lower side of each rectangular frame, and the margin of the preset width is added on each of a left side and right side of each rectangular frame, so that each rectangular frame has a central region and a marginal region surrounding the central region. Next, the central regions of corresponding rectangular frames are filled with the plurality of pieces of fragmented texture data, and the marginal regions of the corresponding rectangular frames are respectively filled with the marginal original texture data of the preset width surrounding the plurality of pieces of fragmented texture data. A filled rectangular frame forms a fragmented texture.

The fragmentation processing is performed on each texture map by repeating the foregoing steps s11 to s13. All texture maps may be each fragmented into a plurality of fragmented textures. A value of the first preset specification is greater than or equal to a sum of a value of the second preset specification and a value of twice the preset width. For example, the value of the first preset specification is 32 pixels, the value of the second preset specification is 30 pixels, and the preset width is 1 pixel; or the value of the first preset specification is 16 pixels, the value of the second preset specification is 14 pixels, and the preset width is 1 pixel.

Figure 3A:
FIG. 3a to FIG. 3c are schematic diagrams of a process of fragmentation processing according to an embodiment of this application.
Figure 3B:
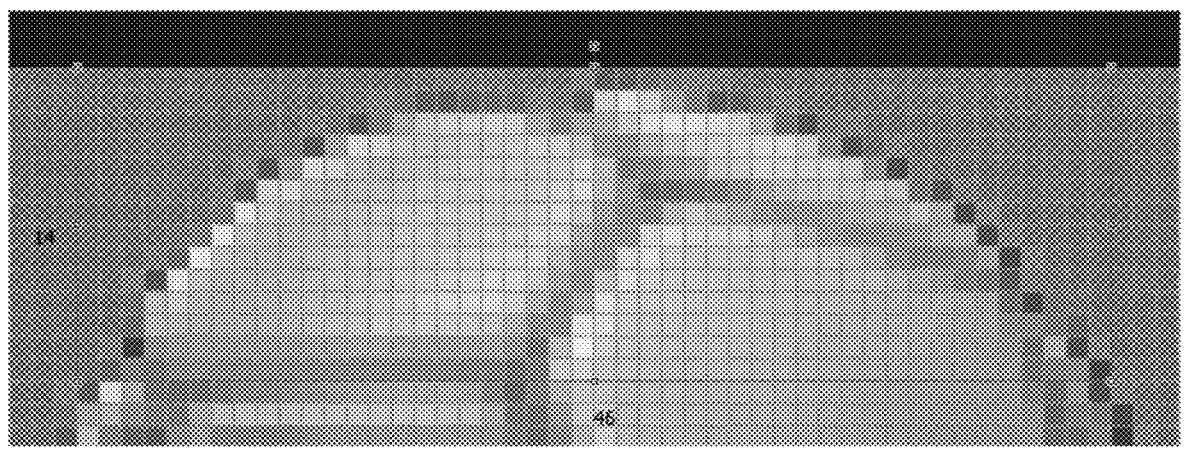
Figure 3C:
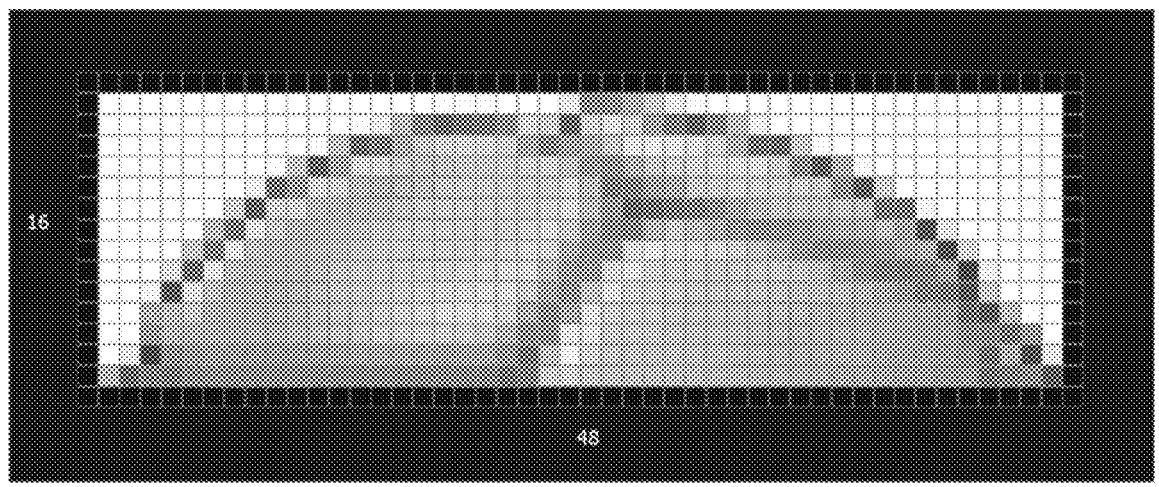

The process of fragmentation processing in steps s11 to s13 is described below with reference to FIG. 3a to FIG. 3c. Assuming that the first preset specification is 32 pixels, the plurality of rectangular frames shown in FIG. 3a may be obtained by cutting the texture map by a row height of 32 pixels. The row height of each rectangular frame is 32 pixels. Locations of a plurality of fragmented textures of a texture map in the video memory are not continuous in sequence, and are possibly scattered. In a process that the plurality of fragmented textures are spliced into a texture map for rendering, in a case that the linear sampling is performed, an irregular colored seam appears. To prevent the irregular colored seam caused by the linear sampling, the process of fragmentation processing in this embodiment needs particular processing. For the process of the particular processing, refer to FIG. 3a to FIG. 3c. The process is specifically: After the plurality of rectangular frames with a row height of 32 pixels is obtained, a margin of 1 pixel is reserved on each of the upper side and the lower side of each rectangular frame, and the margin of 1 pixel is added on each of the left side and the right side of each rectangular frame, so that each rectangular frame has the central region with a height of 30 pixels and the marginal region with a width of 1 pixel surrounding the central region. Next, the fragmentation processing is performed on the original texture data included in the texture map according to the row height of 30 pixels to obtain the plurality of pieces of fragmented texture data, and the marginal original texture data with a width of 1 pixel around each fragmented texture data is obtained from the texture map. Eventually, the central region of the rectangular frame is filled with the fragmented texture data with the row height of 30 pixels, and the marginal region with the width of 1 pixel around the central region is filled with the marginal original texture data. In this case, a filled rectangular frame forms a fragmented texture.

In the foregoing examples, only an example in which the margin of 1 pixel is reserved on each of the upper side and the lower side of the rectangular frame, and the margin of 1 pixel is added on each of the left side and the right side of the rectangular frame to form the marginal region is used. In another possible example, the margin of 1 pixel may alternatively be added on each of the upper side and the lower side of the rectangular frame, or the margin of 1 pixel may be reserved on each of the left side and the right side of the rectangular frame. In short, the marginal region can be formed by adding or reserving pixels.

The encapsulation process in step S203 may specifically include the following steps s21 to s23:

s21. Obtain an attribute of each texture map. The attribute includes an ID, a release type, and offset information. The release type includes immediate release, automatic release, or a resident internal memory.

An ID of one texture map is used for uniquely identifying the one texture map. The offset information is used for determining a storage location of the texture map in the resource file. The release type may be set in the rendering engine of the game before the game rendering.

The immediate release is: regardless of whether the texture map is added or changed, such access to the texture map may not trigger loading of the texture map. The texture map is loaded only in a case that the texture map is actually required (for example, the texture map is required to draw an element in the game scene). Moreover, after the texture map is loaded, the internal memory space occupied by the texture map is released immediately once the texture map is no longer used (for example, the element is destroyed or hidden). In addition, the release of the texture map may be delayed, for example, release is delayed by 2 s or 5 s. To prevent a case that the texture map immediately needs to be loaded after the release, usually the texture map used in an external interface of the game is of the immediate release type.

The automatic release is: a reference count, similar to a smart pointer, is set for the loaded texture map. The reference count is increased in a case that the texture map is accessed once, and the reference count is reduced in a case that the element corresponding to the texture map is destroyed or the texture map is changed. The internal memory space occupied by the texture map is automatically released once the reference count returns to zero.

The resident internal memory is: after the texture map is loaded into the internal memory, the internal memory space occupied by the texture map is forcibly released only by using an internal interface of the rendering engine of the game.

s22. Generate a brief information table based on the attribute of each texture map.

s23. Store the brief information table into a file header of the resource file, and store the fragmented textures corresponding to each texture map into a file body of the resource file.

In steps s21 to s23, the resource file includes two parts. The brief information table is stored in the file header, and the plurality of fragmented textures corresponding to the texture map are stored in the file body. The texture map and its fragmented textures can be searched and loaded as required by using the brief information table.

Optionally, with reference to the process of fragmentation processing described above, the process of the merging and rendering in step S104 in the game rendering process includes the following steps s31 to s34:

s31. Cut a preset dynamic loading region in the internal memory into rows according to the first preset specification, to form a plurality of dynamic loading rows.

s32. Allocate an idle region of the dynamic loading rows by using a bin-packing algorithm.

s33. Load the fragmented textures corresponding to the target texture map in sequence into the idle region of the dynamic loading row.

s34. Read the loaded fragmented textures from the dynamic loading rows and submit the fragmented textures to the rendering engine of the game for rendering.

In steps s31 to s34, the preset dynamic loading region in the internal memory is a region pre-allocated in the internal memory and configured to dynamically load the fragmented textures. According to an actual situation, the preset dynamic loading region may be a size of one or more dynamic texture maps. For example, the preset dynamic loading region may be represented as one or more dynamic texture maps with the size of 2048*1024. The preset dynamic loading region in the internal memory may be cut into a plurality of rows according to the first preset specification (16 pixels or 32 pixels). Each row is a dynamic loading row. The idle region in each dynamic loading row may be allocated by using the bin-packing algorithm. The idle region is allocated to the plurality of fragmented textures of the target texture map needing to be loaded. After the fragmented textures are loaded, the fragmented textures are submitted to the rendering engine of the game for rendering. A rendering optimization algorithm is used in the process of the merging and rendering herein. Based on the related rendering method for an entire texture map and CPU clipping, the rendering optimization algorithm calculates the coordinates of the entire texture map by using the related rendering method. The coordinates of each fragmented texture are calculated based on a relative location proportion of the fragmented texture in the entire texture map. In actual implementation, the rendering optimization algorithm may be represented by using the following code snippets:

```
blend=(smash->GetFormat( )==NPPixeFormat::PF_R8G8B8A8)||srcabm
!=0||bcolor.a !=1.0f);
    npf32sx1=(npf32)(smash->GetImageX( ));
    npf32sy1=(npf32)(smash->GetImageY( ));
    npf32 sx2=NPMathWrap::Min(sx1+(npf32)(smash->GetImageW( )-2),
(npf32)(smash->GetSrcX( )+smash->GetImage( )->GetSrcW( )));
    npf32 sy2=NPMathWrap::Min(sy1+(npf32)(NP2DSSmash::HTILE-2),
(npf32)(smash->GetSrcX( )+smash->GetImage( )->GetSrcW( )));
    if(uv2.x<sx1||
      uv1.x>sx2||
      uv2.y<sy1||
      uv1.y>sy2)
      return;
    texID=smash->GetSmashTexture( )->GetTextureID( );
    NPTexture*texture=NP2DSTextureCache::GetIns( )->GetTexture(texID);
    npf32invw=1.0f/texture->GetWidth( );
    npf32invh=1.0f/texture->GetHeight( );
    npf32fx1=(uv1.x>sx1)?uv1.x:sx1;
    npf32fy1=(uv1.y>sy1)?uv1.y:sy1;
    npf32fx2=(uv2.x<sx2)?uv2.x:sx2;
    npf32fy2=(uv2.y<sy2)?uv2.y:sy2;
    npf32rx1=(fx1-uv1.x)/(uv2.x-uv1.x);
    npf32ry1=(fy1-uv1.y)/(uv2.y-uv1.y);
    npf32rx2=(fx2-uv1.x)/(uv2.x-uv1.x);
    npf32ry2=(fy2-uv1.y)/(uv2.y-uv1.y);
    npf32dx1;
    npf32dy1;
    npf32dx2;
    npf32dy1;
    if (NPConfig::GetGlobalCoef( )==0)
    {
      dx1=(npf32)(smash->GetSmashX( )+1)+(fx1-sx1)/2.0f;
      dy1=(npf32)(smash->GetSmashR( )*NP2DSSmash::HCOEF+1)+(fy1-
sy1)/2.0f;
      dx2=dx1+(fx2-fx1)/2.0f;
      dy2=dy1+(fy2-fy1)/2.0f;
    }
    npu32abgr=bcolor.GetABGR( );
```

```
NP2DSRenderPool::Vertex vertexs[4];
NPVector2pt1=pt+d1*(l1*rx1)+d2*(l2*ry1);
NPVector2pt2=pt+d1*(l1*rx2)+d2*(l2*ry2);
NPVector2pt3=pt+d1*(l1*rx1)+d2*(l2*ry2);
NPVector2pt4=pt+d1*(l1*rx2)+d2*(l2*ry1);
```

Figure 4:
FIG. 4 is a schematic diagram of a picture effect of merging and rendering according to an embodiment of this application.

Referring to an actual rendering effect in the game and a storage state of the fragmented textures in the video memory shown in FIG. 4, the fragmented textures in the video memory are arranged in rows in sequence. In an actual application, the picture effect of rendering obtained by merging the plurality of fragmented textures for rendering is kept completely the same as that obtained by rendering the entire target texture map. However, the burden of the internal memory and the video memory is obviously reduced, and the rendering performance is improved effectively.

Optionally, the game rendering method provided in this embodiment of this application further includes the following steps:

S208. Obtain the release type of the target texture map from the file header of the resource file.

S209. Release the dynamic loading rows occupied by each fragmented texture of the target texture map according to the obtained release type.

S210. Merge the recovered dynamic loading rows.

In steps S208 to S210, after the plurality of fragmented textures of the target texture map are merged for rendering, the internal memory space occupied by each fragmented texture needs to be released according to the release type of the target texture map. Specifically, because the fragmented textures are loaded into the dynamic loading rows in the internal memory, the dynamic loading rows recover the allocated idle region after the internal memory space occupied by the fragmented textures is released. The recovered dynamic loading rows are then merged. It may be understood that, each dynamic loading row is initially obtained by cutting the preset dynamic loading region. All dynamic loading rows may be merged to form the preset dynamic loading region after all dynamic loading rows are recovered.

Figure 5:
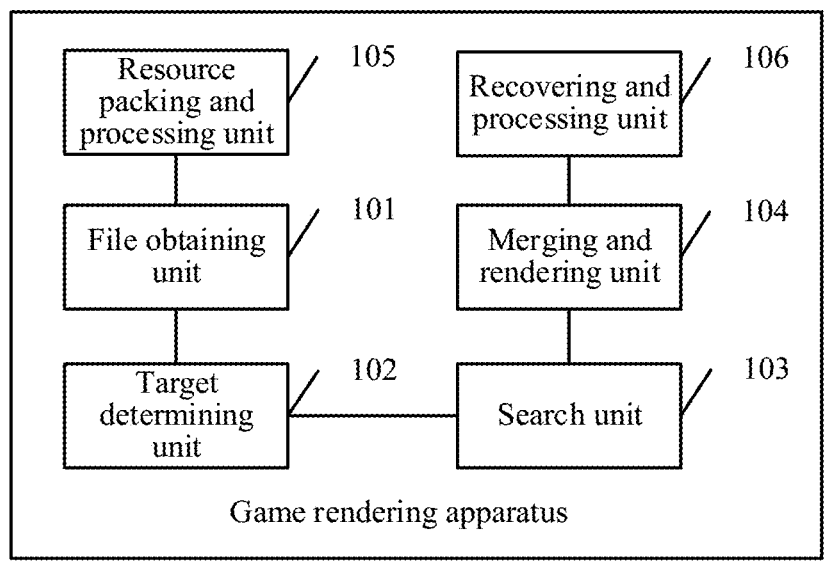
FIG. 5 is a schematic structural diagram of a game rendering apparatus according to an embodiment of this application.

Based on the foregoing embodiment of the game rendering method, an embodiment of this application further provides a game rendering apparatus. The game rendering apparatus may be a computer program (including program code), and the computer program can be executed in a terminal (for example, a PC or a mobile phone) to perform the game rendering method described in the foregoing embodiment. Referring to FIG. 5, the game rendering apparatus runs the following units:

a file obtaining unit 101, configured to obtain a resource file of a game, the resource file including at least one texture map required by game rendering, each texture map being formed by merging a plurality of fragmented textures;

a target determining unit 102, configured to determine a target texture map used by a to-be-rendered mesh in a current running scene of the game;

a search unit 103, configured to search the resource file for the plurality of fragmented textures corresponding to the target texture map; and a merging and rendering unit 104, configured to merge the plurality of fragmented textures corresponding to the target texture map for rendering.

Optionally, the game rendering apparatus further runs the following unit:

a resource packing and processing unit 105, configured to: obtain the at least one texture map required by the game rendering, and the texture map including original texture data; perform fragmentation processing separately on each texture map to obtain a plurality of fragmented textures, and a fragmented texture including a piece of fragmented texture data and marginal original texture data of a preset width surrounding the fragmented texture data; encapsulate the plurality of fragmented textures corresponding to each texture map into the resource file.

Optionally, the game rendering apparatus further runs the following unit:

a recovering and processing unit 106, configured to: obtain a release type of the target texture map from a file header of the resource file; release the dynamic loading rows occupied by each fragmented texture of the target texture map according to the obtained release type; and merge the recovered dynamic loading rows.

In actual implementation, a process in which the game rendering apparatus runs the resource packing and processing unit 105 is specifically: select each texture map in sequence, and cut the selected texture map into rows according to a first preset specification to obtain a plurality of rectangular frames; perform fragmentation processing on the original texture data included in the selected texture map according to a second preset specification to obtain a plurality of pieces of fragmented texture data, and obtain the marginal original texture data of the preset width around each fragmented texture data; and fill corresponding rectangular frames with the plurality of pieces of fragmented texture data and the marginal original texture data of the preset width, a filled rectangular frame forming a fragmented texture; and a value of the first preset specification being greater than or equal to a sum of a value of the second preset specification and a value of twice the preset width, where the filling corresponding rectangular frames with the plurality of pieces of fragmented texture data and the marginal original texture data of the preset width, a filled rectangular frame forming a fragmented texture includes: reserving a margin of the preset width on each of an upper side and a lower side of each rectangular frame, and adding the margin of the preset width on each of a left side and right side of each rectangular frame, so that each rectangular frame has a central region and a marginal region surrounding the central region; and filling the central regions of corresponding rectangular frames with the plurality of pieces of fragmented texture data, respectively filling the marginal regions of the corresponding rectangular frames with the marginal original texture data of the preset width surrounding the plurality of pieces of fragmented texture data, a filled rectangular frame forming a fragmented texture; and the process is specifically: obtain an attribute of each texture map, the attribute including an ID, the release type, and offset information, and the release type including immediate release, automatic release, or a resident internal memory; generate a brief information table based on the attribute of each texture map; and store the brief information table into a file header of the resource file, and store the plurality of fragmented textures corresponding to each texture map into a file body of the resource file.

In actual implementation, a process in which the game rendering apparatus runs the merging and rendering unit 104 is specifically: cut a preset dynamic loading region in an internal memory into rows according to the first preset specification, to form a plurality of dynamic loading rows; allocate an idle region of the dynamic loading rows by using a bin-packing algorithm; load the fragmented textures corresponding to the target texture map in sequence into the idle region of the dynamic loading rows; and read the loaded fragmented textures from the dynamic loading rows and submit the fragmented textures to a rendering engine of the game for rendering.

According to an embodiment of this application, steps S101 to S104 in the game rendering method shown in FIG. 1 may be performed by the units of the game rendering apparatus shown in FIG. 5. For example, steps S101 to S104 shown in FIG. 1 may be respectively performed by the file obtaining unit 101, the target determining unit 102, the search unit 103, and the merging and rendering unit 104 shown in FIG. 5.

Optionally, steps S201 to S203 in the game resource file generation method shown in FIG. 2 may be performed by the resource packing and processing unit 105 shown in FIG. 5.

Optionally, the foregoing steps S208 to S210 may be performed by the recovering and processing unit 106 shown in FIG. 5.

In addition, based on the foregoing embodiment of the game resource file generation method, an embodiment of this application further provides a game resource file generation apparatus. The game resource file generation apparatus may be a computer program (including program code), and the computer program can be executed in a terminal (for example, a PC) to perform the game resource file generation method described in the foregoing embodiment. Exemplarily, the game resource file generation apparatus may run the following units:

a map obtaining unit, configured to obtain at least one texture map required by game rendering, the texture map including original texture data;

a fragmentation processing unit, configured to perform fragmentation processing separately on each texture map to obtain a plurality of fragmented textures; and a file encapsulation unit, configured to encapsulate the fragmented textures corresponding to each texture map into the resource file of the game.

According to an embodiment of this application, steps S201 to S203 in the game resource file generation method shown in FIG. 2 may be performed by the units of the game resource file generation apparatus. For example, steps S201 to S203 shown in FIG. 2 may be performed by the map obtaining unit, the fragmentation processing unit, and the file encapsulation unit.

In addition, for the specific running process of the map obtaining unit, the fragmentation processing unit, and the file encapsulation unit, refer to the related description of the specific running process of the resource packing and processing unit 105 in the embodiment shown in FIG. 5. Details are not described herein again.

According to another embodiment of this application, a part or all of the units of the game rendering apparatus or the game resource file generation apparatus described in the foregoing may be combined into one or several other units, or one (or more) of the units may be divided into a plurality of units of smaller functions. In this way, same operations can be implemented without affecting implementation of the technical effects of the embodiments of this application. The foregoing units are divided based on logical functions. In an actual application, a function of one unit may be implemented by a plurality of units, or functions of a plurality of units are implemented by one unit. In another embodiment of this application, the game rendering apparatus may also include another unit. During practical application, these functions may also be cooperatively implemented by another unit and may be cooperatively implemented by a plurality of units.

According to another embodiment of this application, a computer program (including program code) that can execute steps in the method shown in FIG. 1 or FIG. 2 may be run on a general computing device of a computer including processing elements and storage elements such as a central processing unit (CPU), a random access memory (RAM), and a read-only memory (ROM), to implement the game rendering method according to the embodiments of this application, or implement the game resource file generation method according to the embodiments of this application. The computer program may be recorded in, for example, a computer readable recording medium, and may be loaded into the foregoing computing device by using the computer readable recording medium, and run in the computing device. The computer readable recording medium may be referred to as a computer readable storage medium or the storage device described above. For example, the computer readable recording medium may be a ROM, a RAM, a CD-ROM, a magnetic tape, a floppy disk, or an optical data storage device.

According to this embodiment of this application, fragmentation processing is performed on a texture map to obtain a plurality of fragmented textures in a resource packing process. The fragmented textures corresponding to a used target texture map are loaded based on a requirement of game rendering, and the internal memory loading overheads can be effectively reduced, and the internal memory burden can be reduced. Moreover, the fragmented textures corresponding to the target texture map are merged for rendering, and the picture effect of rendering can be ensured, and the internal memory burden can be prevented from linearly increasing with running of a game, thereby ensuring that the game runs smoothly.

Figure 6:
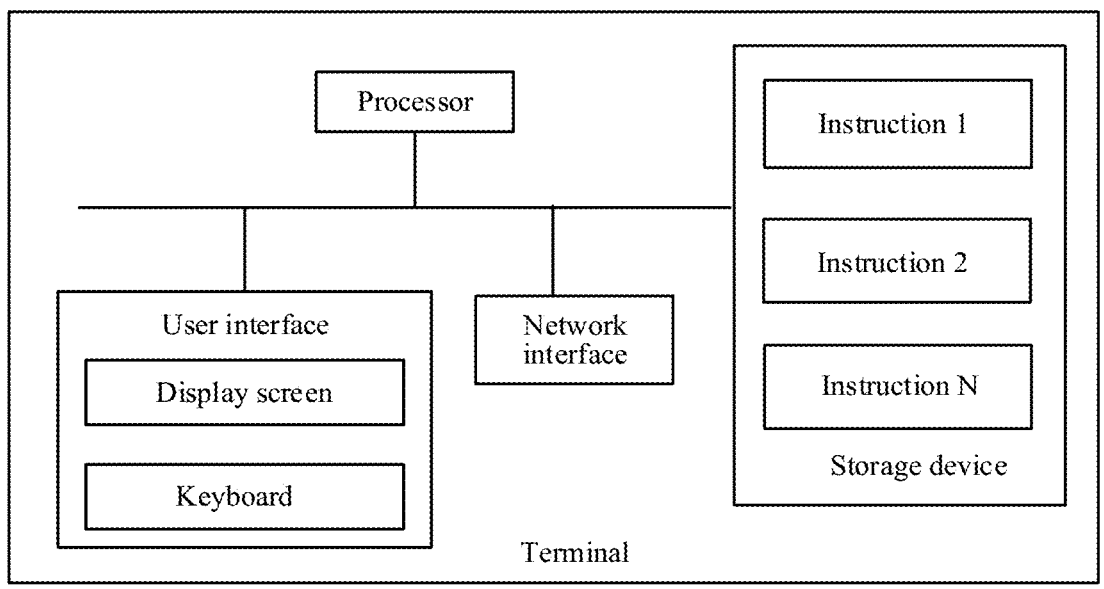
FIG. 6 is a schematic structural diagram of a terminal according to an embodiment of this application.

Based on the methods and the apparatuses according to the foregoing embodiments, an embodiment of this application further provides a terminal. The terminal may be configured to perform corresponding steps of the method process shown in FIG. 1 or perform corresponding steps of the method process shown in FIG. 2. In actual implementation, the terminal described in the embodiments of this application includes but is not limited to another portable device such as a mobile phone, a laptop computer, or a tablet computer provided with a touch-sensitive surface (for example, a touchscreen display and/or a touch pad). In some embodiments, the device is not a portable communication device, but a desktop computer with a touch-sensitive surface (for example, a touchscreen display and/or touch pad). Referring to FIG. 6, internal structures of the terminal may include a processor, a user interface, a network interface, and a storage device. The processor, the user interface, the network interface, and the storage device in the terminal may be connected through a bus or in another manner. In FIG. 6 of the embodiments of this application, connection through a bus is taken as an example.

The user interface is an interaction and information exchange medium between a user and a terminal, specifically including a display screen used to output, a keyboard used to input, and so on. The keyboard here may be a physical keyboard, or a touch-screen virtual keyboard, or a physical and touch-screen virtual keyboard. However, the user interface may further include one or more other physical user interface devices such as a mouse and/or a control handle. The processor (or central processing unit (CPU)) is a computing core and a control core of the terminal, which is configured to implement one or more instructions and specifically configured to load and execute one or more instructions to implement the corresponding method processes or functions, for example, the CPU may be configured to analyze an on/off instruction transmitted by the user to the terminal, and control the terminal to perform on/off operations; for another example, the CPU may transmit various interaction data between internal structures of the terminal, and the like. The storage device (Memory) is a memory device in the terminal, and is configured to store programs and data. The storage device herein may include an internal storage device of the terminal, and may also include an expanded storage device supported by the terminal. The storage device provides a storage space, storing an operating system of the terminal. One or more instructions configured to be loaded and executed by the processor are further stored in the storage space. The instructions may be one or more computer programs (including program code). The storage device herein may be a high speed RAM or a non-volatile memory, for example, at least one magnetic disk memory. Optionally, the storage device may be at least one storage device located away from the foregoing processor.

The terminal supports various application programs, for example, one or more of the following: a drawing application program, a demonstration application program, a word processing application program, a website establishing application program, a disk burning application program, a spreadsheet application program, a game application program, a telephone application program, a video conferencing application program, an email application program, an instant messaging application program, an exercise supporting application program, a photo management application program, a digital camera application program, a digital video camera application program, a web browsing application program, a digital music player application program, and/or a digital video player application program. Various application programs that can be executed on the terminal may use at least one public physical user interface device such as the touch-sensitive surface. One or more functions of the touch-sensitive surface and corresponding information displayed on the terminal may be adjusted and/or changed between the application programs and/or in corresponding application programs. In this case, the public physical architecture (for example, the touch-sensitive surface) of the terminal may support various application programs of the user interface that are intuitive and transparent to the user.

In an embodiment of this application, a processor loads and executes one or more instructions stored in a storage device to implement corresponding steps in the method process shown in FIG. 1 or FIG. 2. In actual implementation, the one or more instructions in the storage device are loaded by the processor to perform the following steps:

obtaining a resource file of a game, the resource file including at least one texture map required by game rendering, the one texture map being formed by merging a plurality of fragmented textures;

determining a target texture map used by a to-be-rendered mesh in a current running scene of the game;

searching the resource file for fragmented textures corresponding to the target texture map; and merging the fragmented textures corresponding to the target texture map for rendering.

In actual implementation, before the obtaining a resource file of a game, the one or more instructions in the storage device are loaded by the processor to further perform the following steps:

obtaining at least one texture map required by game rendering, the texture map including original texture data;

performing fragmentation processing separately on each texture map to obtain a plurality of fragmented textures, a fragmented texture including a piece of fragmented texture data and marginal original texture data of a preset width surrounding the fragmented texture data;

encapsulating the fragmented textures corresponding to each texture map into the resource file.

In actual implementation, in the process of performing fragmentation processing separately on each texture map to obtain a plurality of fragmented textures, the one or more instructions in the storage device are loaded by the processor to specifically perform the following steps:

selecting each texture map in sequence, and cutting the selected texture map into rows according to a first preset specification to obtain a plurality of rectangular frames;

performing fragmentation processing on the original texture data included in the selected texture map according to a second preset specification to obtain a plurality of pieces of fragmented texture data, and obtaining the marginal original texture data of the preset width around each fragmented texture data; and filling corresponding rectangular frames with the plurality of pieces of fragmented texture data and the marginal original texture data of the preset width, a filled rectangular frame forming a fragmented texture;

a value of the first preset specification being greater than or equal to a sum of a value of the second preset specification and a value of twice the preset width.

In actual implementation, in the process of filling corresponding rectangular frames with the plurality of pieces of fragmented texture data and the marginal original texture data of the preset width, a filled rectangular frame forming a fragmented texture, the one or more instructions in the storage device are loaded by the processor to specifically perform the following steps:

reserving a margin of the preset width on each of an upper side and a lower side of each rectangular frame, and adding the margin of the preset width on each of a left side and right side of each rectangular frame, so that each rectangular frame has a central region and a marginal region surrounding the central region; and filling the central regions of corresponding rectangular frames with the plurality of pieces of fragmented texture data, and respectively filling the marginal regions of the corresponding rectangular frames with the marginal original texture data of the preset width surrounding the plurality of pieces of fragmented texture data, a filled rectangular frame forming a fragmented texture.

In actual implementation, in the process of encapsulating the fragmented textures corresponding to each texture map into the resource file the one or more instructions in the storage device are loaded by the processor to specifically perform the following steps:

obtaining an attribute of each texture map, the attribute including an ID, a release type, and offset information, the release type including immediate release, automatic release, or a resident internal memory;

generating a brief information table based on the attribute of each texture map; and storing the brief information table into a file header of the resource file, and storing the fragmented textures corresponding to each texture map into a file body of the resource file.

In actual implementation, in the process of merging the fragmented textures corresponding to the target texture map for rendering, the one or more instructions in the storage device are loaded by the processor to specifically perform the following steps:

cutting a preset dynamic loading region in an internal memory into rows according to the first preset specification, to form a plurality of dynamic loading rows;

allocating an idle region of the dynamic loading rows by using a bin-packing algorithm;

loading the fragmented textures corresponding to the target texture map in sequence into the idle region of the dynamic loading row; and reading the loaded fragmented textures from the dynamic loading rows and submitting the fragmented textures to a rendering engine of the game for rendering.

In actual implementation, after the merging the plurality of fragmented textures of the target texture map for rendering, the one or more instructions in the storage device are loaded by the processor to further perform the following steps:

obtaining the release type of the target texture map from the file header of the resource file;

releasing the dynamic loading rows occupied by each fragmented texture of the target texture map according to the obtained release type; and merging the recovered dynamic loading rows.

In another embodiment, the one or more instructions in the storage device are loaded by the processor to perform the following steps:

obtaining at least one texture map required by game rendering, the texture map including original texture data;

performing fragmentation processing separately on each texture map to obtain a plurality of fragmented textures; and encapsulating the fragmented textures corresponding to each texture map into the resource file of the game.

According to this embodiment of this application, fragmentation processing is performed on a texture map to obtain a plurality of fragmented textures in a resource packing process. The fragmented textures corresponding to a used target texture map are loaded based on a requirement of game rendering, and the internal memory loading overheads can be effectively reduced, and the internal memory burden can be reduced. Moreover, the fragmented textures corresponding to the target texture map are merged for rendering, and the picture effect of rendering can be ensured, and the internal memory burden can be prevented from linearly increasing with running of a game, thereby ensuring that the game runs smoothly.

In description of the present disclosure, description of reference terms such as "one embodiment", "some embodiments", "example", "specific example" or "some examples" means including specific features, structures, materials, or features described in the embodiment or example in at least one embodiment or example of the present disclosure. In this specification, schematic descriptions of the foregoing terms are not necessarily directed at a same embodiment or example. In addition, the described specific features, structures, materials, or features can be combined in a proper manner in any one or more embodiments or examples. In addition, in a case that is not mutually contradictory, a person skilled in the art can combine or group different embodiments or examples that are described in this specification and features of the different embodiments or examples.

In addition, terms "first" and "second" are only used to describe the objective and cannot be understood as indicating or implying relative importance or implying a quantity of the indicated technical features. Therefore, features defining "first" and "second" can explicitly or implicitly include at least one of the features. In the descriptions of this application, unless explicitly specified, "multiple" means at least two, for example, two or three.

Any process or method in the flowcharts or described herein in another manner may be understood as indicating a module, a segment, or a part including code of one or more executable instructions for implementing a particular logical function or process step. In addition, the scope of embodiments of this application includes other implementations which do not follow the order shown or discussed, including performing, according to involved functions, the functions basically simultaneously or in a reverse order, which is to be understood by a person skilled in the art to which the embodiments of this application belong.

Parts of this application may be implemented by using hardware, software, firmware, or combinations thereof. In the foregoing implementations, a plurality of steps or methods may be implemented by using software or firmware that are stored in a storage device and are executed by a proper instruction execution system. For example, if being implemented by hardware, like another implementation, the plurality of steps or methods may be implemented by any one of following common technologies in the art or a combination thereof: a discrete logic circuit of a logic gate circuit for realizing a logic function for a data signal, an application specific integrated circuit having a suitable combined logic gate circuit, a programmable gate array (PGA), and a field programmable gate array (FPGA). In addition, functional units in the embodiments of this application may be integrated into one processing module, or each of the units may exist alone physically, or two or more units are integrated into one module. The integrated module may be implemented in a form of hardware, or may be implemented in a form of a software functional module. When the integrated module is implemented in the form of a software functional module and sold or used as an independent product, the integrated module may be stored in a computer-readable storage medium.

The foregoing disclosure is merely exemplary embodiments of this application, and certainly is not intended to limit the protection scope of this application. Therefore, equivalent variations made in accordance with the claims of this application shall fall within the scope of this application.

What is claimed is:

1. A game rendering method, applied to a computing device having one or more processors and memory storing a plurality of programs to be executed by the one or more processors and the method comprising:

obtaining at least one texture map required by the game rendering, the texture map comprising original texture data;

performing fragmentation processing separately on each texture map to obtain a plurality of fragmented textures, each fragmented texture comprising a piece of fragmented texture data and marginal original texture data of a preset width surrounding the fragmented texture data; and encapsulating the fragmented textures corresponding to the texture map into a resource file, the each fragmented texture comprising the piece of fragmented texture data and the marginal original texture data;

obtaining the resource file of a game;

determining a target texture map required by a to-be-rendered mesh in a current running scene of the game;

searching the resource file for the fragmented textures corresponding to the target texture map; and merging the fragmented textures corresponding to the target texture map for the game rendering, the each fragmented texture comprising the piece of fragmented texture data and the marginal original texture data.

2. The game rendering method according to claim 1, wherein the performing fragmentation processing separately on each texture map to obtain a plurality of fragmented textures comprises:

selecting each texture map in sequence, and cutting the selected texture map into rows according to a first preset specification to obtain a plurality of rectangular frames;

performing a fragmentation process on the original texture data comprised in the selected texture map according to a second preset specification to obtain a plurality of pieces of fragmented texture data, and obtaining the marginal original texture data of the preset width around each fragmented texture data; and filling corresponding rectangular frames with the plurality of pieces of fragmented texture data and the marginal original texture data of the preset width, a filled rectangular frame forming a fragmented texture;

a value of the first preset specification being greater than or equal to a sum of a value of the second preset specification and a value of twice the preset width.

3. The game rendering method according to claim 2, wherein the filling corresponding rectangular frames with the plurality of pieces of fragmented texture data and the marginal original texture data of the preset width, a filled rectangular frame forming a fragmented texture comprises:

reserving a margin of the preset width on each of an upper side and a lower side of each rectangular frame, and adding the margin of the preset width on each of a left side and right side of each rectangular frame, so that each rectangular frame has a central region and a marginal region surrounding the central region; and filling the central regions of corresponding rectangular frames with the plurality of pieces of fragmented texture data, and respectively filling the marginal regions of the corresponding rectangular frames with the marginal original texture data of the preset width surrounding the plurality of pieces of fragmented texture data, a filled rectangular frame forming a fragmented texture.

4. The game rendering method according to claim 1, wherein the encapsulating the fragmented textures corresponding to each texture map into the resource file comprises:

obtaining an attribute of each texture map, the attribute comprising an ID, a release type, and offset information, the release type comprising immediate release, automatic release, or a resident internal memory;

generating a brief information table based on the attribute of each texture map; and storing the brief information table into a file header of the resource file, and storing the fragmented textures corresponding to each texture map into a file body of the resource file.

5. The game rendering method according to claim 4, further comprising:

after merging the fragmented textures corresponding to the target texture map for rendering:

obtaining the release type of the target texture map from the file header of the resource file;

releasing the dynamic loading rows occupied by each fragmented texture of the target texture map according to the obtained release type; and merging the recycled dynamic loading rows.

6. The game rendering method according to claim 1, wherein the merging the fragmented textures corresponding to the target texture map for rendering comprises:

cutting a preset dynamic loading region in an internal memory into rows according to the first preset specification, to form a plurality of dynamic loading rows;

allocating an idle region of the dynamic loading rows by using a bin-packing algorithm;

loading the fragmented textures corresponding to the target texture map in sequence into the idle region of the dynamic loading row; and reading the loaded fragmented textures from the dynamic loading rows and submitting the fragmented textures to a rendering engine of the game for rendering.

7. A computing device comprising one or more processors, memory coupled to the one or more processors and a plurality of programs stored in the memory that, when executed by the one or more processors, cause the computing device to perform a plurality of operations comprising:

obtaining at least one texture map required by the game rendering, the texture map comprising original texture data;

performing fragmentation processing separately on each texture map to obtain a plurality of fragmented textures, each fragmented texture comprising a piece of fragmented texture data and marginal original texture data of a preset width surrounding the fragmented texture data; and encapsulating the fragmented textures corresponding to the texture map into a resource file, the each fragmented texture comprising the piece of fragmented texture data and the marginal original texture data;

obtaining the resource file of a game;

determining a target texture map required by a to-be-rendered mesh in a current running scene of the game;

searching the resource file for the fragmented textures corresponding to the target texture map; and merging the fragmented textures corresponding to the target texture map for the game rendering, the each fragmented texture comprising the piece of fragmented texture data and the marginal original texture data.

8. The computing device according to claim 7, wherein the performing fragmentation processing separately on each texture map to obtain a plurality of fragmented textures comprises:

selecting each texture map in sequence, and cutting the selected texture map into rows according to a first preset specification to obtain a plurality of rectangular frames;

performing a fragmentation process on the original texture data comprised in the selected texture map according to a second preset specification to obtain a plurality of pieces of fragmented texture data, and obtaining the marginal original texture data of the preset width around each fragmented texture data; and filling corresponding rectangular frames with the plurality of pieces of fragmented texture data and the marginal original texture data of the preset width, a filled rectangular frame forming a fragmented texture;

a value of the first preset specification being greater than or equal to a sum of a value of the second preset specification and a value of twice the preset width.

9. The computing device according to claim 8, wherein the filling corresponding rectangular frames with the plurality of pieces of fragmented texture data and the marginal original texture data of the preset width, a filled rectangular frame forming a fragmented texture comprises:

reserving a margin of the preset width on each of an upper side and a lower side of each rectangular frame, and adding the margin of the preset width on each of a left side and right side of each rectangular frame, so that each rectangular frame has a central region and a marginal region surrounding the central region; and filling the central regions of corresponding rectangular frames with the plurality of pieces of fragmented texture data, and respectively filling the marginal regions of the corresponding rectangular frames with the marginal original texture data of the preset width surrounding the plurality of pieces of fragmented texture data, a filled rectangular frame forming a fragmented texture.

10. The computing device according to claim 7, wherein the encapsulating the fragmented textures corresponding to each texture map into the resource file comprises:

obtaining an attribute of each texture map, the attribute comprising an ID, a release type, and offset information, the release type comprising immediate release, automatic release, or a resident internal memory;

generating a brief information table based on the attribute of each texture map; and storing the brief information table into a file header of the resource file, and storing the fragmented textures corresponding to each texture map into a file body of the resource file.

11. The computing device according to claim 10, wherein the plurality of operations further comprise:

after merging the fragmented textures corresponding to the target texture map for rendering:
obtaining the release type of the target texture map from the file header of the resource file;
releasing the dynamic loading rows occupied by each fragmented texture of the target texture map according to the obtained release type; and
merging the recycled dynamic loading rows.

12. The computing device according to claim 7, wherein the merging the fragmented textures corresponding to the target texture map for rendering comprises:

cutting a preset dynamic loading region in an internal memory into rows according to the first preset specification, to form a plurality of dynamic loading rows;
allocating an idle region of the dynamic loading rows by using a bin-packing algorithm;
loading the fragmented textures corresponding to the target texture map in sequence into the idle region of the dynamic loading row; and
reading the loaded fragmented textures from the dynamic loading rows and submitting the fragmented textures to a rendering engine of the game for rendering.

13. A non-transitory computer readable storage medium storing a plurality of machine readable instructions in connection with a computing device having one or more processors, wherein the plurality of machine readable instructions, when executed by the one or more processors, cause the computing device to perform a plurality of operations including:

obtaining at least one texture map required by the game rendering, the texture map comprising original texture data;

performing fragmentation processing separately on each texture map to obtain a plurality of fragmented textures, each fragmented texture comprising a piece of fragmented texture data and marginal original texture data of a preset width surrounding the fragmented texture data; and encapsulating the fragmented textures corresponding to the texture map into a resource file, the each fragmented texture comprising the piece of fragmented texture data and the marginal original texture data;

obtaining the resource file of a game;

determining a target texture map required by a to-be-rendered mesh in a current running scene of the game;

searching the resource file for the fragmented textures corresponding to the target texture map; and merging the fragmented textures corresponding to the target texture map for the game rendering, the each fragmented texture comprising the piece of fragmented texture data and the marginal original texture data.

14. The non-transitory computer readable storage medium according to claim 13, wherein the performing fragmentation processing separately on each texture map to obtain a plurality of fragmented textures comprises:

selecting each texture map in sequence, and cutting the selected texture map into rows according to a first preset specification to obtain a plurality of rectangular frames;

performing a fragmentation process on the original texture data comprised in the selected texture map according to a second preset specification to obtain a plurality of pieces of fragmented texture data, and obtaining the marginal original texture data of the preset width around each fragmented texture data; and filling corresponding rectangular frames with the plurality of pieces of fragmented texture data and the marginal original texture data of the preset width, a filled rectangular frame forming a fragmented texture;

a value of the first preset specification being greater than or equal to a sum of a value of the second preset specification and a value of twice the preset width.

15. The non-transitory computer readable storage medium according to claim 14, wherein the filling corresponding rectangular frames with the plurality of pieces of fragmented texture data and the marginal original texture data of the preset width, a filled rectangular frame forming a fragmented texture comprises:

reserving a margin of the preset width on each of an upper side and a lower side of each rectangular frame, and adding the margin of the preset width on each of a left side and right side of each rectangular frame, so that each rectangular frame has a central region and a marginal region surrounding the central region; and filling the central regions of corresponding rectangular frames with the plurality of pieces of fragmented texture data, and respectively filling the marginal regions of the corresponding rectangular frames with the marginal original texture data of the preset width surrounding the plurality of pieces of fragmented texture data, a filled rectangular frame forming a fragmented texture.

16. The non-transitory computer readable storage medium according to claim 13, wherein the encapsulating the fragmented textures corresponding to each texture map into the resource file comprises:

obtaining an attribute of each texture map, the attribute comprising an ID, a release type, and offset information, the release type comprising immediate release, automatic release, or a resident internal memory;

generating a brief information table based on the attribute of each texture map; and storing the brief information table into a file header of the resource file, and storing the fragmented textures corresponding to each texture map into a file body of the resource file.

17. The non-transitory computer readable storage medium according to claim 16, wherein the plurality of operations further comprise:

after merging the fragmented textures corresponding to the target texture map for rendering:

obtaining the release type of the target texture map from the file header of the resource file;

releasing the dynamic loading rows occupied by each fragmented texture of the target texture map according to the obtained release type; and merging the recycled dynamic loading rows.

\* \* \* \* \*